United States Patent [19]
Busch et al.

[11] Patent Number: 5,024,426
[45] Date of Patent: Jun. 18, 1991

[54] BIMETALLIC SPRING MEMBER FOR RADIATION ENVIRONMENT

[75] Inventors: Raymond A. Busch, Benton; John F. Patterson, Richland, both of Wash.

[73] Assignee: Advanced Nuclear Fuels Corporation, Richland, Wash.

[21] Appl. No.: 324,947

[22] Filed: Mar. 17, 1989

[51] Int. Cl.$^5$ ................................. F16F 1/18
[52] U.S. Cl. ................................. 267/158; 267/182; 376/441
[58] Field of Search ................. 267/47, 158, 160, 163, 267/182; 376/441, 442

[56] References Cited

U.S. PATENT DOCUMENTS

| | | | |
|---|---|---|---|
| 3,238,779 | 3/1966 | Wolfe | 267/158 X |
| 4,654,192 | 3/1987 | Hutter et al. | 376/336 |
| 4,678,632 | 7/1987 | Ferrari | 376/442 X |
| 4,695,426 | 9/1987 | Nylund | 376/442 X |
| 4,756,878 | 7/1988 | King et al. | 376/439 |
| 4,839,136 | 6/1989 | De Mario et al. | 376/441 X |
| 4,859,407 | 8/1989 | Nylund | 376/446 |

Primary Examiner—Duane A. Reger
Attorney, Agent, or Firm—Volker R. Ulbrich; Lawrence C. Edelman

[57] ABSTRACT

A spring member is formed of at least two layers metallurgically bonded together uniformly and having significantly different rates of irradiation growth, so that the differential growth of the layers results in increased stress in a predetermined direction. The layers may be of different metals or of similar metals which have been treated to give them different growth rates, such as zircaloy with different tin and oxygen content. Examples of other properties which may be used to obtain differential growth rates for the two layers when they are of material with substantially the same constituents are alpha-beta phase transformation temperature, the annealing temperature, the work history, partial recrystallization, and precipitation hardening.

16 Claims, 3 Drawing Sheets

BIMETALLIC SPRING MEMBER FOR RADIATION ENVIRONMENT

FIELD OF THE INVENTION

The invention relates to apparatus used in radiation environments, particularly the core of nuclear fission reactors.

BACKGROUND OF THE INVENTION

Apparatus which is exposed to strong radiation can suffer significant changes in its mechanical properties as a result of irradiation damage to the structural materials of the apparatus. One environment in which this problem is particularly pronounced is the core of a nuclear fission reactor. The core assembly of the reactor includes many parts of metal. Some of these parts are in the form of springs of various kinds. For example, the fuel rods of the assembly are typically held within individual openings of grid spacers against at least one spring member, such as a leaf spring, to permit some longitudinal movement resulting from thermal expansion while nevertheless maintaining the lateral spacing of the tubes. In both boiling water and pressurized water reactors the springs of the core assembly are sometimes made of stainless steel or an alloy known as "inconel". However, where the relatively higher neutron capture of stainless steel or inconel cannot be tolerated, it is the practice to use an alloy known as "zircaloy". Furthermore, for spring members which are subjected to relatively intense irradiation, it is the practice to prefer the use of inconel. It has greater resistance to stress relaxation as a result of the irradiation than is the case for zircaloy, even though zircaloy is less neutron absorbent. There is therefore a need for reducing the irradiation stress relaxation of spring material, especially zircaloy.

SUMMARY OF THE INVENTION

In accordance with the present invention a novel spring member is made with a multi-layer structure of which the metals exhibit different degrees of growth as a result of irradiation induced changes. By appropriate choice of the growth differential, the stress relaxation of the spring member as a result of irradiation can be controlled. By means of the present invention, zircaloy springs can have their stress relaxation characteristics improved sufficiently to make their performance comparable to that of inconel, thereby bringing with their use the benefit of a lower neutron absorption.

DETAILED DESCRIPTION

Figure 1:
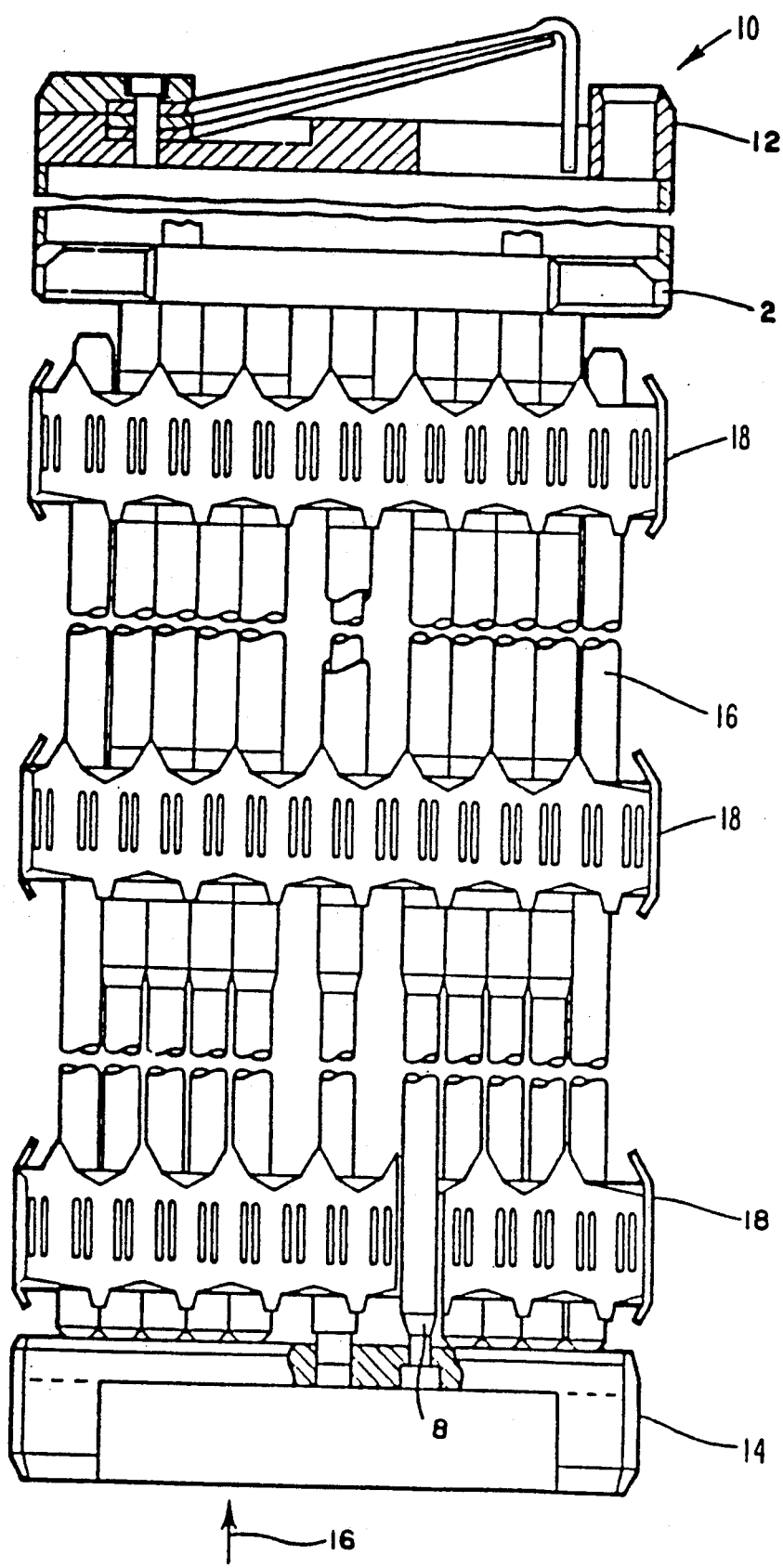
FIG. 1 is a front view of a prior art nuclear reactor core in which tubular fuel elements are held in a spaced relationship by grid spacers.

FIG. 1 illustrates a nuclear reactor core 10 having upper and lower tie plates 12,14, respectively, and a plurality of tubular fuel elements 16 extending between them. A core of this type is described, for example in U.S. Pat. No. 4,756,878 issued July 12, 1988 and assigned to the same assignee as is the present invention. The contents of that patent are hereby incorporated by reference herein. The fuel elements 16 pass through several grid spacers 18, by means of which their lateral spacing from each other is maintained.

Figure 2:
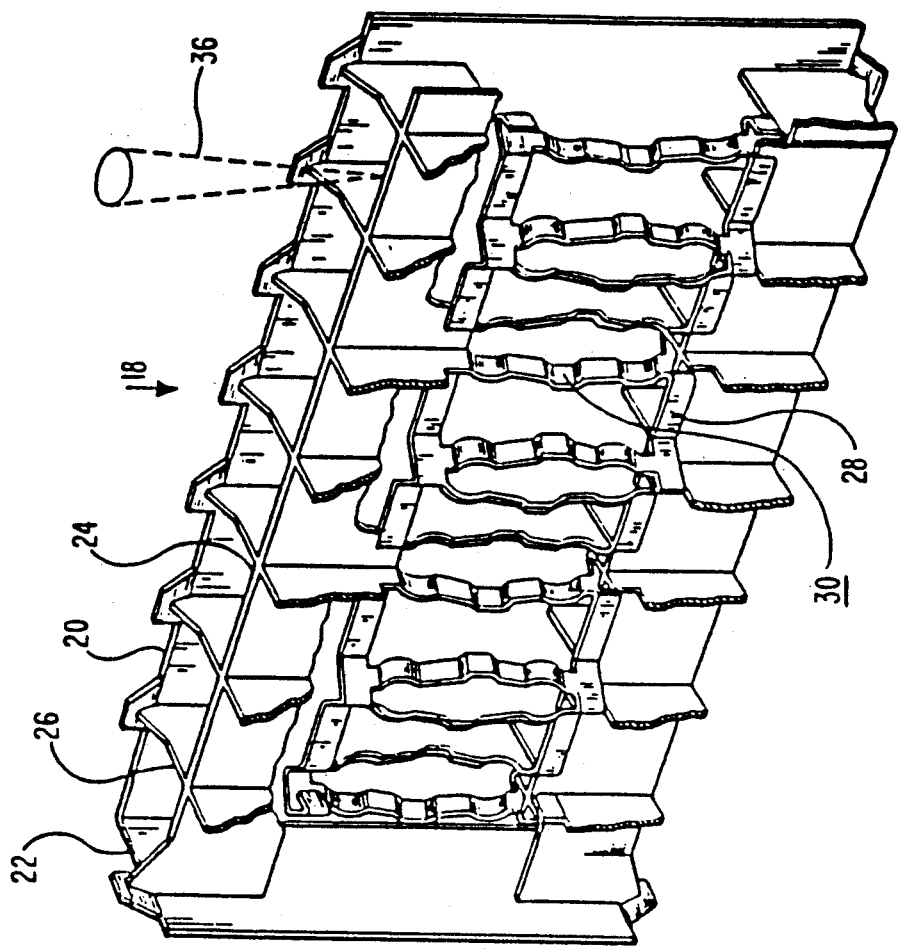
FIG. 2 is an isometric view of a fragment of a grid spacer for the core of FIG. 1 in accordance with one embodiment of the present invention.

One embodiment of the invention is in the form of the novel grid spacer 18, a fragment of which is illustrated in FIG. 2. The spacer 18 is made entirely of zircaloy sheet and includes perimeter strips 20,22 between which there are fastened grid members 24,26 to create a plurality of square openings arranged in a regular grid pattern. Spring elements 28 are fixed within openings in the grid members 24,26 and are so designed that four leaf springs 30 of the spring elements 28 face each into one of four adjoining openings. The leaf springs 30 are approximately 0.4 millimeters thick and are a differential growth bimetallic structure, a fragment of which is shown in exaggerated detail in FIG. 3.

Figure 3:
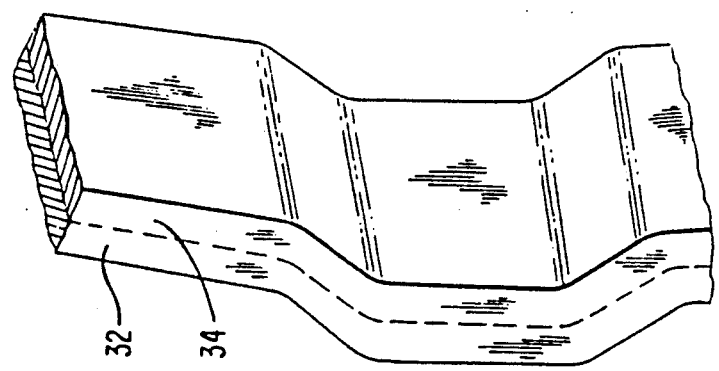
FIG. 3 is a partially sectioned view of a segment of a spring of the grid spacer of FIG. 2.

Referring now to FIG. 3, the spring 30 has an outer layer 32 on the convex side of the spring 30, facing toward the opening, and an inner layer 34 on the concave side of the spring 30. The outer layer 32 is of a first zirconium alloy material which undergoes a first rate of irradiation growth and the inner layer 34 is of a second zirconium alloy material which undergoes a second rate of irradiation growth, less than the first rate. The two alloys are variations of a single zirconium alloy with the tin and oxygen contents controlled to produce a higher recrystallization temperature in one layer than in the other. For example, the outer layer 32 is composed of 1.5 to 1.7 percent by weight of tin and 0.12 to 0.15 percent by weight of oxygen and the inner layer 34 may be composed of 0.5 to 1.0 percent by weight of tin and 0.06 to 0.10 percent by weight of oxygen. The layers 32,34 are formed by roll-bonding of two separate sheets. The bonding may be performed by hot pressing, hot rolling, extrusion, or the like. The combined sheet then undergoes a final heat treatment by being heated to 650-750 degrees centigrade for 2-10 minutes. Under irradiation, the stress-relieved layer shows greater growth, resulting in a tendency for an accentuated curvature of the spring 30 to counteract any stress relaxation of the individual layers 32,34 due to the irradiation.

Figure 5:
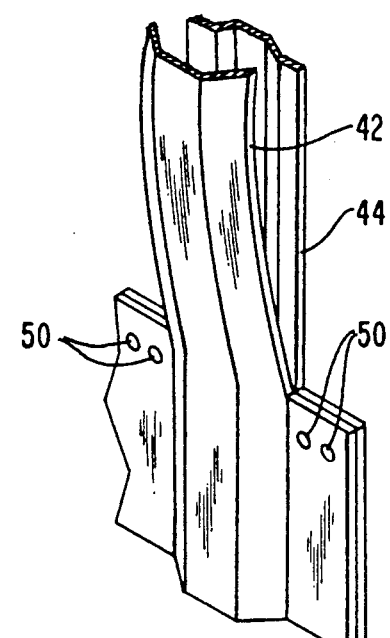
FIG. 5 is an exaggerated, sectioned fragment of the grid spacer of FIG. 4.
Figure 4:
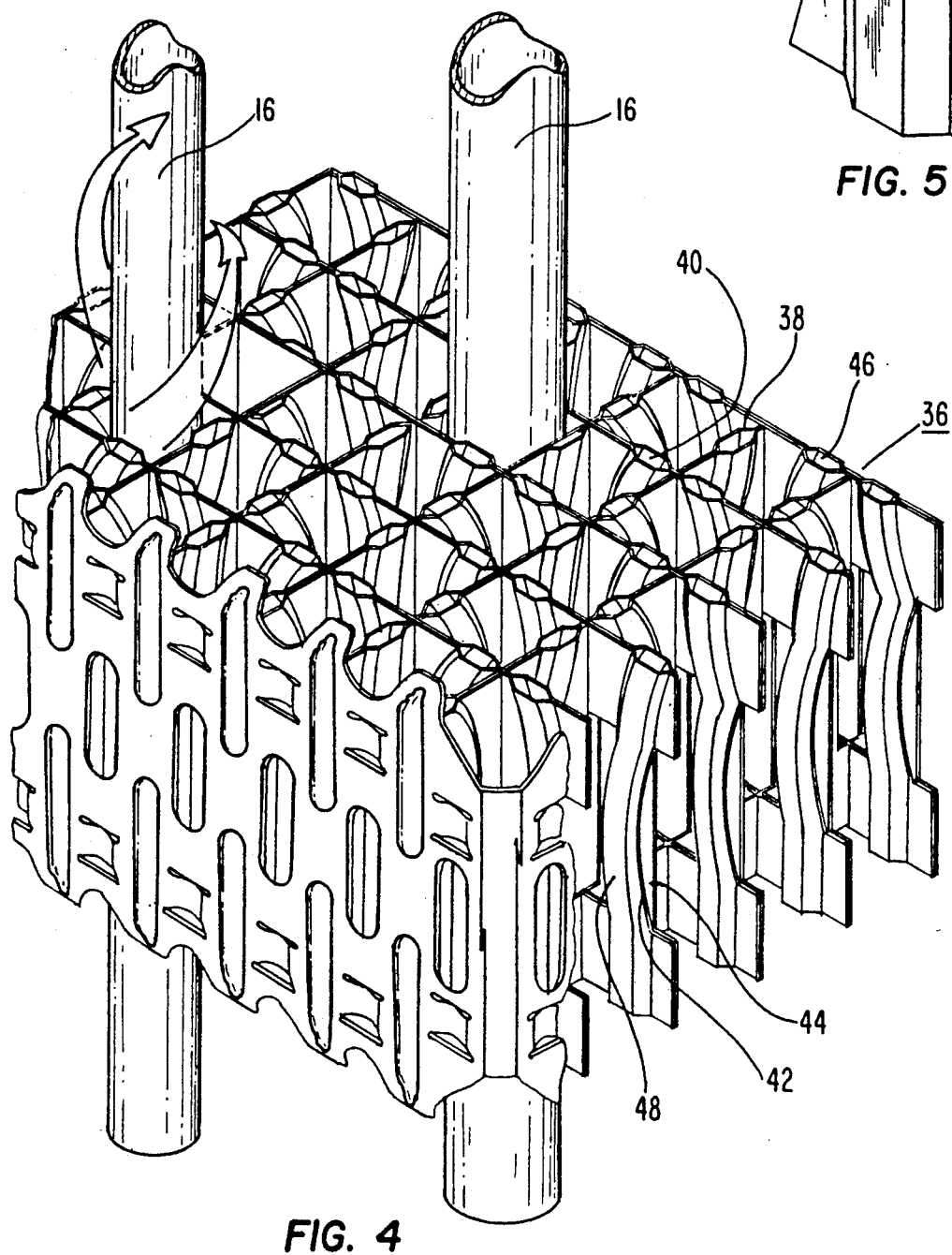
FIG. 4 is sectioned, isometric view of a different type of grid spacer in accordance with another embodiment of the present invention.

Another embodiment of the invention, shown in FIG. 4, is a different type of grid spacer 36 of a type also described in the above-referenced patent. In the spacer 36 the grid members 38,40 are formed by two metal sheet wall members 42,44. Each of the sheets 42,44 defines one-half of channels 46 for creating turbulence in the cooling water flow for the reactor. One side portion of the wall members 42 of the channels 46 are bowed out to act as a deformable bias spring 48 for the fuel element 16, while the other wall member 40 is not bowed and maintains its generally straight crossectional configuration. The FIG. 5 shows in exaggerated detail where the wall members 42,44 are attached by spot welds 50. The bowed wall member 42, which includes the spring 48, is of cold-worked zircaloy which has been stress relief annealed, for example at a temperature less than about 600 degrees centigrade, but not recrystallized. The straight wall member 44 is of zircaloy which has been recrystallized annealed or prepared in such a manner that there is a significant precipitation hardening, which may be established by the addition of one or more elements from the group consisting of chromium, molybdenum, vanadium, tungsten, iron, nickel, and copper. The preferred of these are chromium, molybdenum, and iron. The resulting structure exhibits differential irradiation deformation such that with increasing irradiation, the bowed wall member 42 grows at a higher rate than the straight wall member 44, thus tending to accentuate the curvature of the spring 48 and thereby tending to counteract relaxation of the spring portion 48 of the walls of the channels 46.

Spring structures in accordance with the invention can be fabricated with any two otherwise compatible metals which have different rates of irradiation growth. For that matter, there can be more than two layers, if desirable for other reasons. The layer thicknesses should be chosen to suit the materials and their characteristics for the particular application. The layers may be of different materials or of similar materials which have undergone different histories to obtain different mechanical properties. Various known characteristics may be used to obtain metals with the same or nearly the same composition, but which exhibit irradiation growth differentials. For example, metal compositions can be provided with different selected alpha-to-beta phase transformation temperatures, so that an annealing temperature can be selected to transform one layer, but not the other, or at least produce a significant difference in the fraction transformed. The transformation would randomize the crystallographic texture of that layer, while the texture of the untransformed layer would be unchanged. Due to the anisotropy of the zirconium, this would provide a difference in the growth of the layers in their major plane during irradiation. This could be achieved, for example, by combining zirconium-niobium and Zircaloy layers.

It is likely that useful differences in irradiation growth between the layers of a spring component in accordance with the invention may be obtained by selection of the heat treatment they receive before they are roll-bonded together, for example by beta-annealing one layer element and not the other, just prior to bonding them together. The bonding should probably be performed late in the fabrication process to obtain the most useful effect.

While in the above examples the layers are formed by separate sheets of material roll-bonded together, it is also considered feasible to provide a differential treatment of the two sides of a single sheet of material to form therein two layers with different irradiation growth rates. This could be done, for example, by providing different surface annealing treatments or by driving different constituents into the surfaces by, for example, a heat diffusion or ion implantation.

We claim:

1. A spring member for use in an environment having radiation of sufficient intensity to cause significant stress relaxation during the working life of the spring member, said spring member comprising:
at least first and second sheets of spring material fastened to each other as a layered structure, the first sheet having a first irradiation growth rate and the second sheet having a second irradiation growth rate, the second rate being significantly greater than the first rate.

2. The spring member in accordance with claim 1 wherein the first and second sheets having a similar chemical composition, but have been treated differently to result in different rates of irradiation growth.

3. The spring member in accordance with claim 2 wherein the first and second sheets are of zirconium based alloys, the first sheet having been precipitation hardened and the second sheet having been cold-worked.

4. The spring member in accordance with claim 2 wherein the first and second sheets have been subjected to different heat treatments and then roll-bonded together.

5. The spring member in accordance with claim 1 wherein the first and second sheets are of metals with different compositions.

6. The spring member in accordance with claim 5 wherein the compositions of the first and second sheets are chosen to yield different alpha-beta phase transformation temperatures and have been annealed at substantially the same temperature at which one has undergone the phase transformation to a significantly greater degree than the other.

7. The spring member in accordance with claim 5 wherein the first and second sheets are of zircaloy, with the second sheet material having its tin and oxygen content different from that of the first sheet material, so that it has a higher recrystallization temperature than does the first sheet material.

8. The spring member in accordance with claim 5 wherein the first sheet is a zirconium-base alloy which has been heat treated to create in it significant precipitation hardening and the second sheet is zircaloy which has been cold-worked.

9. The spring member in accordance with claim 1 wherein the first and second sheets are uniformly metallurgically bonded to each other as first and second layers, respectively, to form a multi-layer composite structure.

10. The spring member in accordance with claim 9 wherein the first and second layers have a similar chemical composition, but have been heat treated differently to result in different rates of irradiation growth.

11. The spring member in accordance with claim 10 wherein the first and second layers are of zirconium-base alloy, the first layer having been precipitation hardened and the second layer having been cold-worked.

12. The spring member in accordance with claim 10 wherein the first and second layers have been subjected to different heat treatments and then roll-bonded together.

13. The spring member in accordance with claim 9 wherein the first and second layers are of metals with different compositions.

14. The spring member in accordance with claim 13 wherein the compositions of the first and second layers are chosen to yield different alpha-beta phase transformation temperatures and have been annealed at substantially the same temperature at which one has undergone the phase transformation to a significantly greater degree than the other.

15. The spring member in accordance with claim 13 wherein the first and second layers are of zircaloy, with the second layer material having its tin and oxygen content different from that of the first, so that it has a higher recrystallization temperature than does the first layer material.

16. The spring member in accordance with claim 13 wherein the first layer is a zirconium-base alloy which has been heat treated to create in it significant precipitation hardening and the second layer is zircaloy which has been cold-worked.

* * * * *